United States Patent Office 3,803,322
Patented Apr. 9, 1974

3,803,322
LITHIUM DERIVATIVE MEDICAMENT
Jean-Claude Denis and Jerome Rambaud, Paris, France, assignors to Franco Chemie S.a.r.l., Paris, France
No Drawing. Continuation of abandoned application Ser. No. 798,180, Feb. 10, 1969. This application Jan. 18, 1972, Ser. No. 218,850
Claims priority, application France, Feb. 16, 1968, 140,204
The portion of the term of the patent subsequent to Oct. 9, 1990, has been disclaimed
Int. Cl. A61k 27/00
U.S. Cl. 424—317       2 Claims

ABSTRACT OF THE DISCLOSURE

Lithium parachlorophenoxyacetate is a novel medicament active in the treatment of mental diseases. It is prepared by reacting parachlorophenoxyacetic acid with lithium carbonate.

This is a continuation of application Ser. No. 798,180 filed Feb. 10, 1969, now abandoned.

BACKGROUND AND SUMMARY OF THE INVENTION

The present invention consists of a medicament positively active in the treatment of mental diseases and obtained by synthesis from a vegetable growth factor, namely parachlorophenoxyacetic acid, and lithium carbonate. This medicament is lithium parachlorophenoxyacetate.

The method of preparing a compound according to this invention consists in reacting the vegetable growth factor with lithium carbonate in an aqueous medium and subsequently evaporating the resulting solution for collecting the product thus obtained which is eventually crystallized.

DETAILED DESCRIPTION OF THE INVENTION

Lithium parachlorophenoxyacetate (or PC 67.8) is described in greater detail hereinafter:

1. Physico-chemical characteristics.—(a) Formula:

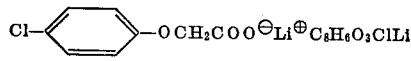

M.W.=192.
M.P.=210 to 214° C. (capillary tube).

(b) Method of preparing the compound

In a one-liter Erlenmeyer flask equipped with a magnetic stirrer and containing a 62.2 g. suspension of parachlorophenoxyacetic acid in 200 ml. of water, 12.4 g. of $Li_2CO_3$ are added by small amounts while stirring during about one hour. After completing the addition of $Li_2CO_3$ the mix is stirred until a clear solution is obtained; then this solution is evaporated in vacuo and the resulting product is crystallized by using 200 ml. of methanol. This crystallization is facilitated by using a few cc. of ethyl ether. After centrifuging and drying these crystals in vacuo, 50 g. of lithium parachlorophenoxy-acetate are obtained.

2. Pharmacological properties.—The toxicity of PC 67.8 is relatively low (a 50 l. d. calculated during 5 days with mice amounted to 1,600 mg./kg.).

The conventional tests for studying the psychomotive behavior in the animal were used, notably the examination of the behavior of an animal placed in a new environment (cylindrical box or perforated board).

The time required for exploring the new environment, the number of passages of the animal across the beam of photoelectric cells, the number of holes explored by the animal with its muzzle, constituted the essential parameters whereby the activity of PC 67.8 was converted into statistical figures. Throughout these tests a sedative an antiolytic action was observed.

These studies were completed by the X-ray encephalographic examination which confirmed the results and proved in addition that the reactions to propioceptive stimulations were extended.

3. Therapeutic applications.—The above-described products were utilized in the treatment of psychiatric diseases of the depressive type, and also of certain psychoses, notably the maniaco-depressive psychosis.

4. Pharmaceutic forms.—The products may be administered by the oral route, or in the form of injections, by the rectal route, or in any pharmaceutically acceptable form.

The useful dose of the active products for human therapy should be an effective non-toxic amount within the range of from 100 to 500 mg. per day, according to cases.

What we claim is:
1. A method of treating psychiatric diseases of the depressive type and maniaco-depressive psychosis consisting of administering to a human a pharmaceutically acceptible form supplying daily from 100 to 500 milligrams of lithium parachlorophenoxyacetate, said administration being orally, by injection or rectally.
2. A method of controlling psychomotive behavior consisting of administering to an animal an effective amount for said control of lithium parachlorophenoxyacetate.

References Cited

Chem. Abst., 63, 13117b (1965).
Chem. Abst., 59, 2082a (1963.
Saltoff, Amer. J. Psychiat., 124:6, December 1967, p. 862.
Gersham, Amer. J. Psychiat., 124:10, April 1968, pp. 1452-56.

STANLEY J. FRIEDMAN, Primary Examiner

PO-1050
(5/69)

UNITED STATES PATENT OFFICE
CERTIFICATE OF CORRECTION

Patent No. __3,803,322__ Dated __April 9, 1974__

Inventor(s) __Jean-Claude Denis and Jerome Rambaud__

It is certified that error appears in the above-identified patent and that said Letters Patent are hereby corrected as shown below:

On the title page, column 1, line 23, after "filed Feb. 10, 1969," delete "now abandoned" and insert --now U.S. Patent No. 3,764,701--.

Signed and sealed this 18th day of February 1975.

(SEAL)
Attest:

RUTH C. MASON
Attesting Officer

C. MARSHALL DANN
Commissioner of Patents
and Trademarks